United States Patent [19]

Ackermann et al.

[11] Patent Number: 4,839,031
[45] Date of Patent: Jun. 13, 1989

[54] PROCESS FOR PERFORMING THE SEPARATION OF EXTRUDED MATERIALS WHICH MAY OR MAY NOT SHOW IMPERFECTIONS

[75] Inventors: François Ackermann, La Voulte sur Rhone; Georges Berrebi, Bourg les Valence, both of France

[73] Assignee: Europeenne de Retraitement de Catalyseurs Eurecat, La Voulte sur Rhone, France

[21] Appl. No.: 130,571

[22] Filed: Dec. 9, 1987

[30] Foreign Application Priority Data

Dec. 9, 1986 [FR] France ................. 86 17317

[51] Int. Cl.⁴ .................................... B07B 13/11
[52] U.S. Cl. ....................... 209/2; 209/434; 209/479; 209/691; 502/21
[58] Field of Search ............ 209/2, 10, 434, 479, 209/480, 459, 691, 694–697; 502/21, 355; 198/756

[56] References Cited

U.S. PATENT DOCUMENTS

| | | | |
|---|---|---|---|
| 2,974,799 | 3/1961 | Gray | 209/434 |
| 3,085,070 | 4/1963 | Fowle et al. | 502/21 |
| 4,022,638 | 5/1977 | Weet | 209/10 |
| 4,070,274 | 1/1978 | Bryson | 209/459 |
| 4,720,473 | 1/1988 | Welch et al. | 502/21 |

FOREIGN PATENT DOCUMENTS

| | | | |
|---|---|---|---|
| 223639 | 5/1987 | European Pat. Off. | 209/691 |
| 2108871 | 5/1983 | United Kingdom . | |

Primary Examiner—James B. Marbert
Assistant Examiner—Donald T. Hajec
Attorney, Agent, or Firm—Millen & White

[57] ABSTRACT

The invention relates to a process for the separation of granulate materials, in extruded form of different lengths and of the same or different diameter. It is characterized by the use of a helicoidal vibrating elevator subjected to vibrations whose amplitude is chosen so as to cause on the threads of the spiral on the one hand the ascending flow of all the particles and on the other hand the recovery of the finest particles on the outer edge of the upper thread of the spiral and the largest particles on the inner edge of the upper thread of this spiral.

4 Claims, 1 Drawing Sheet

PROCESS FOR PERFORMING THE SEPARATION OF EXTRUDED MATERIALS WHICH MAY OR MAY NOT SHOW IMPERFECTIONS

BACKGROUND OF THE INVENTION

The present invention relates to a helicoidal vibrating separating apparatus and its use for performing effective separation between particles in extruded form, for example, to separate extrudates according to their size, weight or their apparent density.

In this text, the word extrudate and term extruded rod shaped materials are used to denote materials having the form of small rods with an outer surface which may or may not be cylindrical. The word extrudate is used as opposed to sphere but it does not exclude materials obtained by casting or molding provided that the latter have shapes approaching those of a small rod with a more or less regular external surface as, for example, trilobate, tetralobate, twists, braids, etc.

This invention, coupled possibly with separation by sifting, enables particularly the restitution to refiners or to petrochemists of extruded batches of catalyst supports or perfectly calibrated catalysts.

The system according to the invention enables particularly the exclusion from a catalyst, of particles which are too fine and hence the elimination of these "fines" in beds that refiners place in hydrotreatment reactors which permits, after sorting, the restitution of a batch of perfectly calibrated extrudates and hence which are reuseable with an efficiency equal to that of new materials. The extrudates or extruded rod shaped materials generally used here are, for example, based on alumina or silica or silica alumina.

The process, according to the invention, is particularly advantageous within the framework of reutilization of a catalyst which has already been used in refining reactions (particularly hydrotreatment). Such a catalyst can not be used as, such particularly because it is attrited and has lost its catalytic properties. It must therefore, before being reutilized, be subjected to a regeneration operation.

However in addition, in the course of the preceeding refining operations, it has been subjected to considerable mechanical stresses. It follows that the catalyst, instead of being in the form of extrudates of the same size and weight (as is the case when the catalyst new), appears after prolonged use in the form of extrudates of sizes and/or weights and/or apparent densities which are different) the apparent density manifests the fact that if the same weight of several types of extrudates are packed in different bottles, different volumes of each of the extrudate types will be obtained. In particular, the catalyst can contain by weight, up to 50% of extrudates of fine size with respect to the normal size of the extrudates used in refining. Now these very fine particles (refiners call them "fines") generally of shorter lengths, for example, about 1.5 mm (0.0015 meters) or about 3 mm (0.003 meters) according to the nature of the catalyst and the refining operation, cannot validly be reintroduced into a refining reactor if it is desired to avoid losses of charges in this reactor. At least the major part of the "fines" should therefore be removed (at least 50%, preferably at least 75% and more particularly at least 90%). Preferably, it is after elimination of the "fines" that the regeneration proper of the catalyst will follow. It is however also possible to carry out this separation operation on a regenerated catalyst.

Various methods have already been proposed for the removal of fines, in particular sifting methods, which finally are inefficient whilst being very tedious. It is, for example, impossible to eliminate by sifting fines of length smaller than 1.5 mm in a batch of extrudates of 1.5 mm diameter. The diameter of the extrudates being equal to the size of the mesh, even catalysts of length greater than 1.5 mm can pass through the mesh lengthwise.

It is an object of the invention to provide a process which enables simply and effectively the elimination of the majority of the extrudates or extruded rod shaped materials of size and/or weight and/or apparent density which are inadequate.

SUMMARY OF THE INVENTION

The apparatus used for practising the invention is of the helicoidal vibrating elevator types; it is constituted by at least one substantially horizontal spiral (substantially vertical axis) whose diameter is comprised preferably between about 50 and 400 mm (0.05 and 0.04 m) and more particularly between 200 and 300 mm (0.2 and 0.3 m) with a pitch (distance between the tops of two turns) generally 50 to 150 mm (0.05 and 0.15 m), and preferably in the order of 80 to 120 mm (0.08 and 0.12 m), for example about 100 mm (0.1 m). The slope is about 2 to 20 degrees and preferably 9 to 16 degrees.

The spiral or each spiral, if there are several of them, can comprise 2 to 9 threads or more, for example, and up to 150 threads by way of example and is wound around a hollow shaft at the base or at the top of which, for example, are positioned systems permitting the shaftspiral assembly to take up a vibratory motion of variable amplitude.

The vibrations may be produced by at least one system placed at any suitable level, for example, at the base or at the top of the shaft or again positioned around the spiral. Among the systems that could be selected, will be named, for example: unbalanced motors, electromagnetic vibrators (energized by variable cycle, with the creation of pulses) and energizers with imbalancing systems.

The amplitude (lateral) of the vibrating motion thus communicated to the assembly (lateral movement of vertical walls of the shaft) can thus vary between 0.2 and 15 mm and preferably between 2 and 5.5 mm. The shaft-spiral assembly, the vibrating source, could positioned, by way of example, on a central post serving as a support, various antivibration materials being interposable between the shaft and the post. The material used for the construction of the spiral, or more exactly of the threads of spiral, may be a sanded mild steel, or stainless steeel, etc, coated by an antirust paint.

By modifying the coating of the thread, that is to say, for example, by spraying a plastic paint or by glueing thereon a strip of rubber, or any other suitable material, it is possible, on the one hand, to modify the coefficient of adherence and, consequently, the segregation of the powdered products for a given amplitude, but also to reduce considerably the noise caused by the motion of the extrudates on the steel.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein.

DESCRIPTION OF PREFERRED EMBODIMENT

Figure 1:
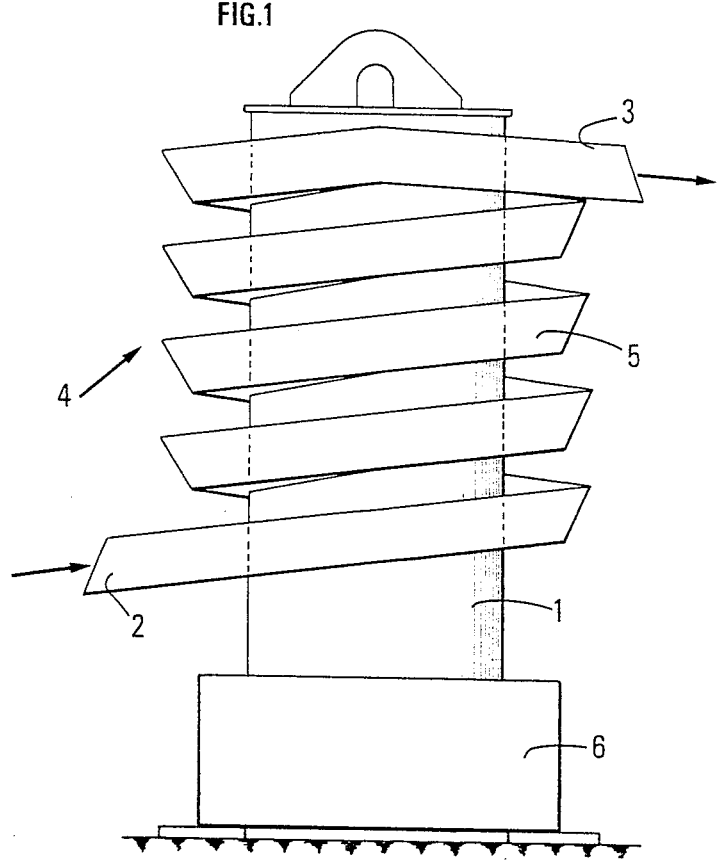
FIG. 1 is a side view of apparatus in accordance with the instant invention showing a conveyor for rod shaped materials comprising a helical path around a post vibrated by an unbalanced motor.

In FIG. 1 is shown a shaft or post 1 with a spiral or helix 4 (helicoidal vibrating elevator) with five threads, such as 5.

The offbalance motor 6, generates vibrations around the axis or post.

The flow of the mixture of extrudates or extruded rod shaped materials to be separated is introduced through the duct 2 into the periphery of the spiral or of the helix, into the lower thread of the spiral or of the helix.

The solid particles thus flow onto the strip of the spiral or flow strip of the thread, this flow strip being bounded by the inner and outer edges of each thread.

It is the regulation of the vibration system, depending essentially on the size of the particles to be separated and their amount, that is to say their speed of introduction into the spiral, which permits the desired separation. There is seen in the vicinity of the solids introduction thread, a fairly disorderly flow of mixtures of extrudates but then unexpectedly, the smallest extrudates and/or broken material becoming little by little a flow from bottom to top, for the most part between the length of the outer edges of the flow strip of each thread and the middle part of the flow surface bounded by the surface of the thread.

As for the longest extrudates, they ascend along the spiral for the most part between the inner edges of the flow strip of each thread and said middle part of the thread. Through this fact, progressively and without constraint, the extrudates of normal size and the fines ascend and separate. They are thus recovered separately at the top through the duct 3. If there are several types of extrudates, the latter are recovered according to their length from the shortest (at the outer periphery of the upper thread) to the longest at the inner periphery of the upper thread.

The system of vibration is subjected to suitable regulation according to the nature and the dimensions of the particles to be separated.

Figure 2:
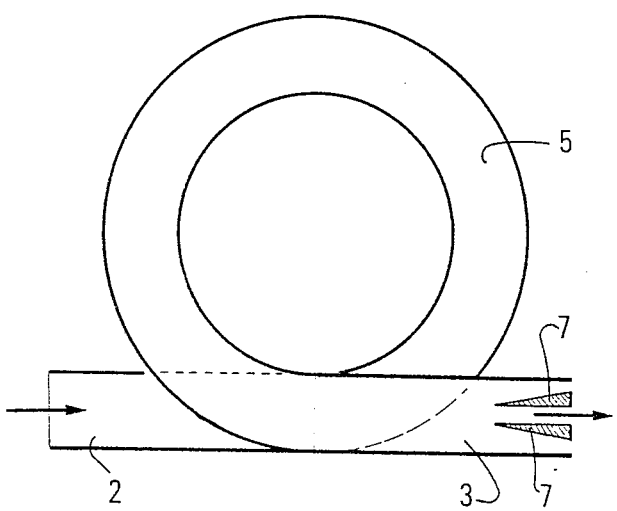
FIG. 2 is a top view of the apparatus of FIG. 1.

FIG. 2 shows the apparatus of FIG. 1, seen from above. There is to be distinguished in particular the arrangement of baffles 7 on the end of the upper thread in order to collect separately various types of extrudate (three types of extrudate in FIG. 2).

EXAMPLE

Separation tests of mixtures of solid particles of a cobalt and molybdenum catalyst deposited on an alumina support were carried out.

The mixture was sent through the duct 2 of FIG. 1. A spiral 4.5 threads was used, the diameter of the thread being 10 cm.

The amplitude of the vibrations was adjusted to 2 mm.

In a first test, there was used a mixture of three types of extrudate of the same catalyst, each of these three types of extrudates representing a third by volume of the total volume of the catalyst: diameter of all the extrudates: 1.5 mm (0.0015 meters).

First type of extrudate: average length: 3.7 mm (0.0037 meters),

Second type of extrudate: average length: 2.8 mm (0.0028 meters),

Third type of extrudates: average length: 1.7 mm (0.0017 meters).

There are recovered at the top of the elevator:
on the outer part of the upper thread: about 70% of the third type of extrudate,
on the inner part of the upper thread: about 85% of the first type of extrudate,
on the middle part of the upper thread, a mixture with about 50% of extrudates of the second type, the remainder being a mixture of the two other types of extrudate.

In the second test, substantially equivalent results were observed using another mixture of three other types of extrudate of the same catalyst, each of these three types of extrudate representing a third by volume of the total volume of the catalyst.

Diameter of all the extrudates: 3 mm (0.003 meters).

First type of extrudate: average length: 4.5 mm (0.0045 meters),

Second type of extrudate: average length: 3.5 mm (0.0035 meters),

Third type of extrudate: average length: 2.5 mm (0.0025 meters).

In a third test, a 50—50 (by volume) mixture of two types of extrudates of 3 mm diameter was used.

First type of extrudate: average length: 4.5 mm (0.0045 meters),

Second type of extrudate: average length: 2.5 mm (0.0025 meters).

Here, there was recovered on the outer part of the upper thread 95% of extrudates of the second type of extrudate and on the inner part of the same thread 95% of extrudates of the first type of extrudate.

A forth test was done with catalysts of different diameters (50% diameter 1.5 mm, 50% diameter 3 mm) and of average length substantially close to 2.5 to 3 mm. There was thus separated on the inner part catalysts of diameter 3 mm containing 5% of diameter 1.5 mm and on the outer part the catalysts diameter 1.5 mm containing 5% of diameter 3 mm.

We claim:

1. A process for separating fines from refining catalysts wherein the catalysts are extruded rod shaped elements, the process comprising the steps of:
    depositing a mixture of the extruded rod shaped elements and fines at a lower location on a spiral track having an inner periphery and an outer periphery, and a slope in the range of 2 to 20 degrees; and
    initially separating the refining catalyst from the fines by subjecting the spiral track to vibratory motion varying between 0.2 and 15 mm to advance the mixture up the spiral track while causing the elements defining the refining catalysts to migrate toward the inner periphery of the track and causing the fines to migrate toward the outer periphery of the track; and
    finally separating the fines from the elements as the mixture leaves the spiral track at an upper end thereof.

2. The process of claim 1 wherein the spiral has a pitch in the range of 50 to 400 mm.

3. The process of claim 1 wherein the catalyst elements have an alumina base.

4. The process of claim 1 wherein the step of finally separating the catalyst elements from the fines is performed by passing the elements and fines on opposite sides of a baffle.

* * * * *